Jan. 10, 1928.

R. T. PIERCE 1,656,013

ELECTRICAL MEASURING INSTRUMENT

Filed Jan. 30, 1923

WITNESSES:

INVENTOR
Raymond T. Pierce
BY
ATTORNEY

Patented Jan. 10, 1928.

1,656,013

UNITED STATES PATENT OFFICE.

RAYMOND T. PIERCE, OF EAST PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed January 30, 1923. Serial No. 615,812.

My invention relates to electrical measuring instruments and particularly to means for limiting the movement of the index or pointer members thereof.

One object of my invention is to provide a means of the above indicated character that shall so absorb the shock attending the sudden stopping of an instrument pointer as to prevent injury to the latter.

Another object of my invention is to provide means that shall co-operate with an element other than the pointer for limiting the movement of an instrument pointer.

A further object of my invention is to so protect an instrument pointer against sudden stops as to render the instrument more durable and effective.

Heretofore, it has been usual, in electrical measuring instruments, to provide a stop member for engagement with the pointers which, by reason of inertia and relatively long delicate construction, were frequently injured by such engagement. This was caused by the concentration of the forces, between the stop member and the pointer, at a local point on the pointer.

In practicing my invention, I provide a yieldable stop member for limiting movement of the pointer that so engages an element, other than the pointer, as to more widely distribute the interacting collision forces, resulting when the pointer is stopped, to reduce the likelihood of injury to the pointer and of affecting the accuracy of the instrument.

Figure 1:
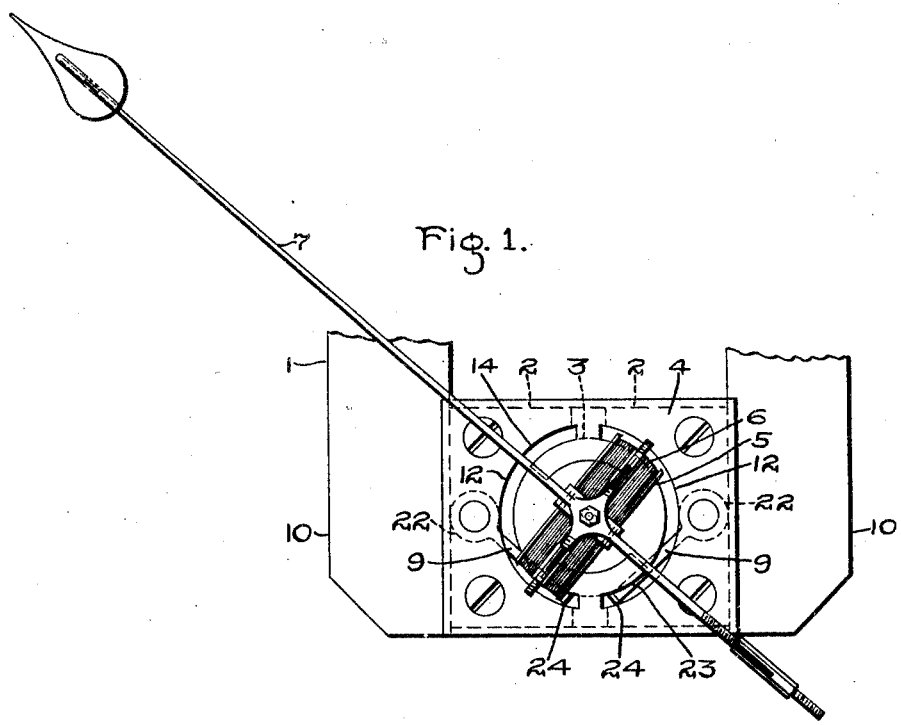
Figure 2:
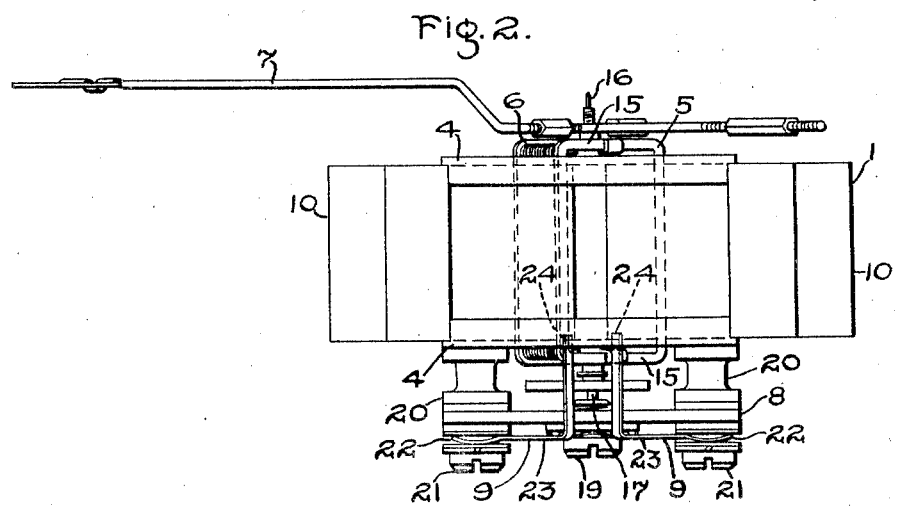

Figure 1 of the accompanying drawing is a front view of a portion of an electrical measuring instrument embodying my invention, and Fig. 2 is an end view of the device shown in Fig. 1.

The device comprises, in general, a permanent magnet 1, pole members 2 therefor, a core member 3 disposed between the members 2, side plates or brackets 4 for holding the core member 3 in position, a bobbin 5 upon which a coil 6 is wound, a pointer 7 carried by the bobbin 5, a bridge structure 8 for supporting the bobbin 5 and stop members 9 for limiting the movement of the pointer 7.

The permanent magnet 1, only a portion of which is shown, is preferably of the usual horse-shoe type, to the ends 10 of which the pole members 2 are secured. The latter are provided with arcuate inner surfaces 12 between which the cylindrical core member 3 is so supported, by the plates 4, as to provide a relatively narrow arcuate air gap 14.

The bobbin 5 is preferably of rectangular frame shape having longitudinal side portions movable in the air gap 14 and end portions 15 which suport shaft portions 16 and 17 mounted, respectively, at the upper and lower ends of the bobbin. The shaft member 16, upon which the pointer 7 is mounted, is provided with a suitable bearing (not shown) and the lower shaft member 17 is mounted in a bearing member 19 that is supported by the bridging member 8. The latter is supported, at its ends, by standards 20 that are secured to the pole pieces 2 by screws 21.

Each stop member 9 comprises an eyelet or supporting portion 22 for mounting around one of the screws 21, a portion 23 projecting radially therefrom and extending transversely to the longitudinal axis of the bobbin 5 and a yieldable stop portion 24 projecting into the air gap 14 for engagement with the bobbin 5.

Since the portions 24 constitute relatively long lever arms, relative to the portions 23 of the members 9, they will yield when engaged by the bobbin 5 at the limits of its movement to thus absorb the shock attending the sudden stopping of the moving system.

By the above described arrangement of parts, the pointer is free from engagement with any stationary element and is therefore prevented from injury from this cause. Being free from violent shocks, the pointer and moving system are less likely to be disturbed in the initial setting thereof and the instrument as a whole is rendered more durable and effective.

While I have shown and described a particular form of my invention, changes may be effected therein without departing from the spirit and scope thereof, as set forth in the appended claims.

I claim as my invention:

1. In an electrical measuring instrument, the combination with a stationary structure having an air gap and a pivoted element movable in said air gap, of a stop member having a portion secured to a side of the stationary structure and a resilient portion for engagement with the movable element laterally projecting from said first portion into the air gap for positioning by the stationary structure.

2. In an electrical measuring instrument, the combination with a stationary structure having an air gap and a pivoted element movable in said air gap, of a pair of stop members for the movable element secured to the stationary structure, each of said stop members having a portion secured to a side of the stationary structure, a portion projecting from said portion to a position opposite one end of said air gap and a resilient portion projecting from the latter portion into the air gap for positioning by the stationary structure.

3. In an electrical measuring instrument, the combination with a stationary structure having an air gap and a pivoted element movable in said air gap, of a pair of stop members, each constructed of resilient sheet material having an enlarged apertured portion secured to a side of the stationary element, an elongated strap portion projecting from said enlarged portion to a position opposite one end of said air gap, and a strap portion projecting from the latter portion into the air gap for positioning by the stationary structure and having a stop surface at right angles to a surface on the movable element.

In testimony whereof, I have hereunto subscribed my name this 11th day of January, 1923.

RAYMOND T. PIERCE.